United States Patent [19]

Merritt

[11] Patent Number: 5,570,908
[45] Date of Patent: Nov. 5, 1996

[54] LOW PARTICULATE ROTARY UNION

[75] Inventor: Michael B. Merritt, Celina, Tex.

[73] Assignee: Texas Instruments Incorporated, Dallas, Tex.

[21] Appl. No.: 456,411

[22] Filed: Jun. 1, 1995

Related U.S. Application Data

[63] Continuation of Ser. No. 218,492, Mar. 24, 1994, abandoned.

[51] Int. Cl.⁶ .................................................. F16L 55/00
[52] U.S. Cl. ................................................ 285/14; 285/276
[58] Field of Search .............................. 285/11, 13, 14, 285/276; 137/580

[56] References Cited

U.S. PATENT DOCUMENTS

| | | | |
|---|---|---|---|
| 3,129,960 | 4/1964 | Schrodt | 285/14 X |
| 3,957,294 | 5/1976 | Hoban et al. | 285/14 X |
| 4,848,400 | 7/1989 | Grant et al. | 137/580 |
| 5,058,927 | 10/1991 | Miwa | 285/11 |
| 5,149,141 | 9/1992 | Newhouse | 285/13 |
| 5,169,408 | 12/1992 | Biggerstaff et al. | 29/25.01 |
| 5,203,592 | 4/1993 | Takada | 285/14 |

*Primary Examiner*—Dave W. Arola
*Attorney, Agent, or Firm*—Warren L. Franz; Wade J. Brady, III; Richard L. Donaldson

[57] ABSTRACT

A rotary union (20) is disclosed for allowing fluid to flow between a first environment and a second environment where the first environment is rotating with respect to the second environment. The rotary union includes a pedestal (38) having a longitudinal pedestal bore (50) for transmitting fluid through pedestal (38); a housing (26) having a longitudinal housing bore (34) for transmitting fluid through housing (26). The diameter of longitudinal pedestal bore (50) of pedestal (38) is greater than the diameter of longitudinal housing bore (34) of housing (26). Housing (26) is coupled to the first environment and pedestal (38) coupled to the second environment; and rotating support structure (58, 60) is provided for coupling housing (26) and pedestal (38) with a gap (70) formed between a top portion of pedestal (38) and housing (26) with rotating support structure (58, 60) disposed below the gap with respect to the applicable gravity field. Rotary union (20) may further include a containment vessel (90) for capturing excess fluid and an adjustment sleeve (72) for adjusting gap (70) between pedestal (38) and housing (26).

32 Claims, 1 Drawing Sheet

5,570,908

LOW PARTICULATE ROTARY UNION

This application is a continuation of application Ser. No. 218,492, filed on Mar. 24, 1994, now abandoned.

TECHNICAL FIELD OF THE INVENTION

This invention relates to fluid delivery systems, and more particularly, relates to rotary unions.

BACKGROUND OF THE INVENTION

In many manufacturing processes, such as semiconductor wafer processing, it is necessary to deliver very pure chemicals. The high purity of the chemicals is typically necessary to prevent contamination of the product by particles which can cause defects in the finished goods.

Semiconductor processing requires very pure chemicals delivered at almost every step of the processing. Impurities or particulates in the chemicals can have serious ramifications during processing; for example, a particle that is only $1/10$ of a micron may be enough to cause a short-type defect in an integrated circuit developed on the wafer. Therefore, it is desirable to reduce and maintain particle contamination at the lowest possible level.

During the processing of semiconductor wafers, it is frequently necessary to rinse the wafers or otherwise apply a chemical. One method of applying the chemical or rinsing fluid to the wafers is to put them in a closed tank and deliver the fluid into a rotating dispenser. Frequently, the fluid source providing fluid to the rotating dispenser is stationary with respect to the dispenser and, thus, necessitates some type of rotating union. Unions developed for this purpose may have suffered from shortcomings such as contamination problems and wear problems.

SUMMARY OF THE INVENTION

A need has arisen for a rotary union that allows fluid communication with a rotating member while substantially preventing contamination and minimizing the wearing of parts. The present invention provides a rotary union that eliminates or substantially reduces the shortcomings associated with prior art rotary unions.

According to an aspect of the present invention a rotary union is provided that includes a pedestal having a longitudinal pedestal bore for transmitting fluid through the pedestal; a housing having a longitudinal housing bore for transmitting fluid through the housing with the housing rotating with respect to the pedestal; and a support structure for coupling the housing and pedestal with a gap formed between a top portion of the pedestal and the housing. According to another aspect of the present invention, the gap is formed above the support structure with respect to gravity or other predominant force field. According to another aspect of the present invention a containment vessel may be coupled to the pedestal for capturing excess fluid. According to yet another aspect of the present invention a labyrinth seal may be included between the pedestal and the housing. According to still another aspect of the present invention, a gap adjustment sleeve may be coupled to the pedestal for adjusting the gap between the pedestal and housing.

A technical advantage of the present invention is that it may minimize the possibility of contamination by particulates introduced through the rotary union. Another technical advantage is that there are no wear parts above any openings such as a gap. Another technical advantage is that a centrifugal force may be used to remove excess fluid which may decrease the chances that unwanted fluid or particulates will enter the rotary union. Yet another technical advantage is that fluid is not drawn into the rotary union through the gap between the housing and pedestal because of a resultant pressure gradient.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE INVENTION

Figure 1:
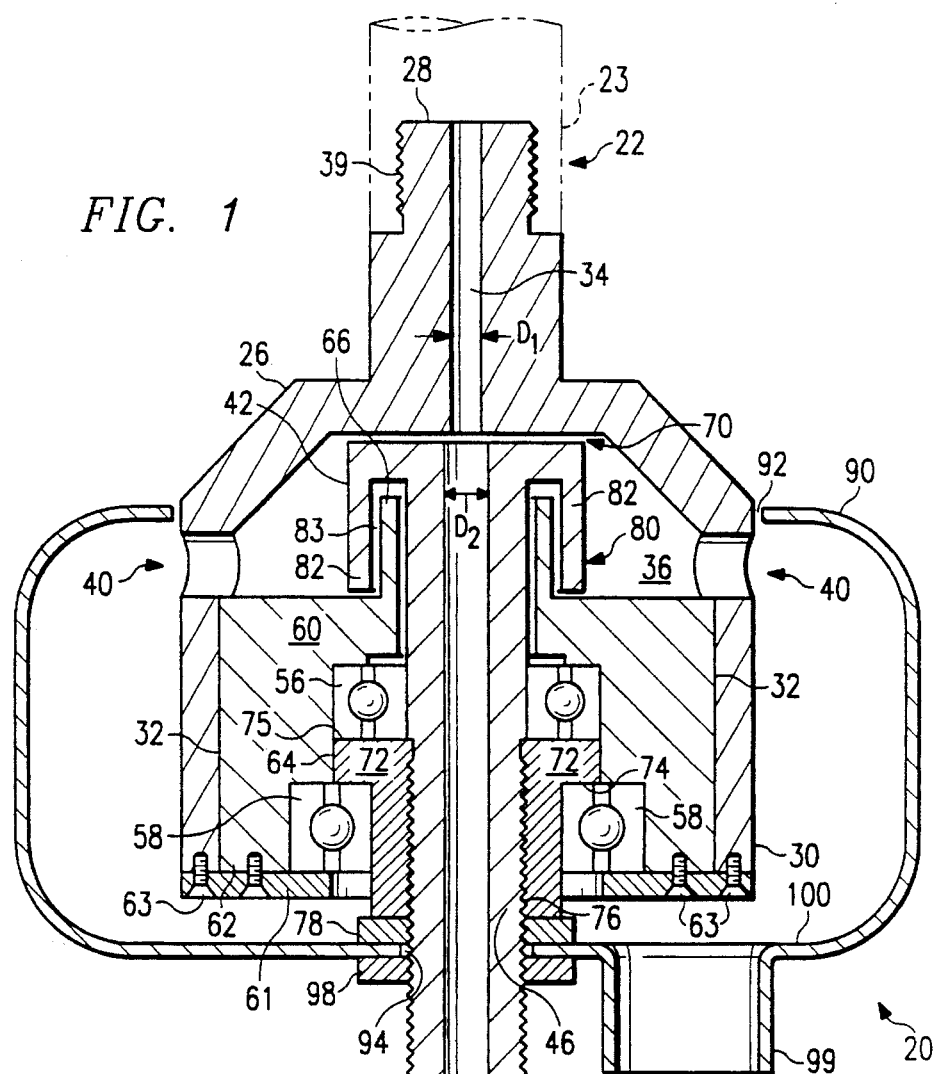
FIG. 1 is a cross sectional view, with portions broken away of one embodiment of a rotary union according to an aspect of the present invention.
Figure 2:
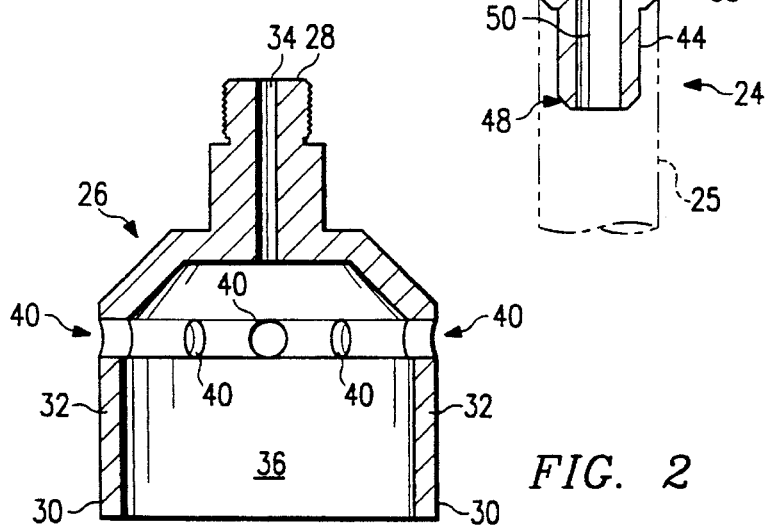
FIG. 2 is a cross-sectional view of a housing according to an aspect of the present invention.

The preferred embodiments of the present invention and their advantages are best understood by referring to FIGS. 1–2 of the drawings, like numerals being used for like and corresponding parts of the various drawings.

Referring to FIG. 1 there is shown one embodiment of a rotary union 20, which has a first end 22 and a second end 24. Rotary union 20 may be used to allow a fluid to be transmitted between a first environment and a second environment where the first environment is rotating with respect to the second environment. For example, rotary union 20 might be used with part of a semiconductor wafer processing system where a rotating tank or fluid delivery system needs to be interfaced with a stationary fluid supply system as is necessary with an acid processor that is available from FSI International. In the FSI acid processor, there is a need to interface a stationary fluid supply to a rotating shaft. According to an aspect of the invention, the interface may be accomplished by coupling first end 22 of rotary union 20 to rotating shaft 23 of the acid processor and coupling second end 24 of rotary union 20 to a portion of fluid supply system 25.

A housing 26 has a first portion or first end or top portion 28 and a second end or bottom portion 30. An intermediate portion 32 is disposed between first end 28 and second end 30. Housing 26 has a longitudinal axial housing bore 34 formed through a portion of it. Longitudinal housing bore 34 has a first diameter ($D_1$). The first longitudinal bore 34 opens onto an upper internal surface of an enlarged hollow region 36 into which pedestal 38 fits, as will be discussed further below. Housing 26 may be formed to have a discharge hole or a plurality of discharge holes 40 extending radially through housing 26 to allow fluid to exit. One arrangement of discharge holes 40 is shown in FIG. 2. Housing 26 may be formed of a single integral piece of material or may be formed from connected components.

First end 28 of housing 26 is formed with or has a connection or fitting 39 for interfacing with shaft 23 of the system to be supplied with fluid. When coupled to the system, housing 26 will rotate along with shaft 23 to which the fluid is being supplied.

Pedestal 38 is used to interface with housing 26, which may be rotating, and to transmit the fluid from the second environment, which may be stationary with respect to housing 26. Pedestal 38 has a first end 42 and a second end 44.

An intermediate portion 46 is disposed between first end or portion 42 and second end or portion 44. A connection or fitting 48 is provided on second end 44 of pedestal 38 to allow pedestal 38 to be connected to a portion of stationary fluid supply system 25. Pedestal 38 is formed with a longitudinal axial pedestal bore 50 having a second diameter ($D_2$). The diameter of longitudinal pedestal bore 50 is preferably sized to be greater than the diameter of longitudinal housing bore 34 of housing 26, i.e., $D_2>D_1$. Housing 26 and pedestal 38 and the other components may be made of any material, but are preferably made from materials with low thermal expansion characteristics and that are generally chemically inert.

Housing 26 and pedestal 38 are coupled by a support structure which may be, for example, a first bearing 56 and a second bearing 58. The support structure 56 and 58 allows the interface of housing 26 and pedestal 38 to allow fluid communication through bores 34 and 50 even though housing 26 is rotating with respect to pedestal 38. A support member 60 may be attached to or formed as part of housing 26 at second end 30 and disposed proximate portion 32 in enlarged area 36. Support member 60 is shown secured to housing 26 by a bottom plate 61 and fasteners 63. Support member 60 may have a first portion 62, an intermediate portion 64 and a second portion 66. Intermediate portion 64 of support member 60 may interface with a portion of first support bearing 56 and second support bearing 58. The support member 60 and bearings 56 and 58 also interface with intermediate portion 46 of pedestal 38 through sleeve 72.

Pedestal 38 and housing 26 are coupled by the support structure, e.g., bearings 56 and 58, support member 60, sleeve 72, bottom plate 61 and fastener 63, in a manner that produces gap 70 where bore the exit part of 50 and the entrance part of bore 34 meet. Gap 70 allows a portion of the fluid being transmitted through pedestal 38 and into housing 26 to flow out from gap 70 over the top first end portion 42, and thereby prevents particulates and other contaminants from entering longitudinal housing bore 34, which could contaminate the fluid. Sizing longitudinal pedestal bore 50 to have a greater diameter than longitudinal housing bore 34 helps to assure that the flow will remain out from gap 70, and thus greatly reduces the risk that contaminants will be drawn into the gap by a vacuum or otherwise. Because longitudinal housing bore 34 has a smaller diameter than longitudinal pedestal bore 50, some excess fluid will flow from gap 70. Sleeve 72 may be configured to selectively adjust gap 70.

Gap adjustment sleeve 72 may have a lower shoulder portion 74 that contacts second bearing 58, an upper shoulder 75 that contacts first support bearing 56, and a straight portion 76 that interfaces with pedestal 38 proximate intermediate portion 46. Gap adjustment sleeve 72 may have threads on straight portion 76 that mate with threads on intermediate portion 46 of pedestal 38. A first jam nut 78 may be used to assist with the adjustment of gap adjustment sleeve 72 by moving sleeve 72 with respect to the interfacing threads and then positioning nut 78. The sizing of gap 70 is determined by the desired or acceptable amount of fluid loss through gap 70 and the amount of thermal expansion that is associated with housing 26 and pedestal 38.

A seal 80 may be provided between housing 26 and pedestal 38 to help prevent fluid from reaching support structure 56 and 58. Seal 80 is preferably a labyrinth-type seal formed by flanged overhangs 82 of pedestal 38 that form a channel 83 into which second end or portion 66 of support member 60 is inserted to form a labyrinth. As fluid flows out of gap 70 and down flange overhangs 82, the fluid is urged away from overhangs 82 by a resultant centrifugal force once the fluid comes into contact with any portion of the rotating structure, e.g., housing 26 or support member 60. Once under the urging of the centrifugal force, the excess fluid flowing out of gap 70 will exit or pass through the discharge hole or plurality of holes 40.

A containment vessel 90 may be secured to pedestal 38 annularly about housing 26 to contain the excess fluid flowing out of discharge hole or holes 40. Containment vessel 90 may be a cylindrical member having a first opening 92 and a second opening 94. The first opening is sized to allow enlarged portion 36 of housing 26 to fit therein with a small space or clearance formed such that rotating housing 26 will not come into contact with stationary vessel 90. Second opening 94 of vessel 90 is sized to fit securely against pedestal 38 and is held in place by a second jam nut 98. A withdrawal opening 99 may be provided in a lower portion 100 of containment vessel 90. Withdrawal opening 99 allows for the exhaust or drainage of excess fluid flowing from gap 70 to exit vessel 90.

Rotary union 20 is preferably oriented with respect to gravity or a resultant centrifugal force if rotary union 20 is part of a larger rotating system (not shown) (collectively referred to as aligned with gravity) such that the gravity is pulling in the direction from first end 22 towards second end 24. This orientation disposes gap 70 above all of the wear parts such as bearings 56 and 58. Because wear parts occasionally may produce particulates, the possibility of contamination due to particulates entering gap 70 is further reduced by this orientation of rotary union 20. Furthermore, the number of wear parts is reduced according to an aspect of the invention. The inclusion of seal 80 and bearings 56 and 58 allows rotary union 20 to have no parts that are in wearing contact except for the bearings 56 and 58, which may be easily accessed and replaced by removing nuts 98 and 78 and bottom plate 61.

Sizing longitudinal pedestal bore 50 to be greater in diameter than longitudinal housing bore 34 helps to assure a positive fluid flow, out of gap 70, which helps to prevent contaminants from entering gap 70 and possibly into longitudinal housing bore 34. Similarly the centrifugal force of rotating housing 26 allows the excess fluid from gap 70 to be discharged through discharge holes 40, which may be advantageous compared to other techniques such as aspirators which on occasion allow some of the aspirating liquid to flow back into the associated fluid system and create contamination problems.

Although the present invention and its advantages have been described in detail, it should be understood that various changes, substitutions and alterations can be made therein without departing from the spirit and scope of the invention as defined by the appended claims.

What is claimed is:

1. A rotary union comprising:
    a pedestal having a first longitudinal bore therethrough for transmitting fluid through the pedestal, the pedestal having a top portion and the first bore having an opening onto said top portion;
    a housing having a second longitudinal bore therethrough for transmitting fluid through the housing; the second bore having an opening opposite the first bore opening, with the diameter of the first bore opening being greater than the diameter of the second bore opening; and
    a support structure coupling the housing and the pedestal to allow the housing to rotate relative to the pedestal, with a gap formed between the top portion of the pedestal and the housing;

the support structure being disposed below the gap with respect to gravity; and the housing being disposed relative to the pedestal to allow fluid communication between the first and second bore openings, across the gap, with a portion of the fluid flowing out from the gap over the pedestal top portion.

2. The rotary union of claim 1 wherein the support structure comprises a plurality of bearings.

3. The rotary union of claim 2 wherein the pedestal includes a flanged overhang portion that forms a channel, and the housing includes a portion which is inserted into the channel to form a labyrinth to substantially prevent fluid leaving the gap from contacting the bearings.

4. The rotary union of claim 1 further comprising a containment vessel coupled to the pedestal for capturing the fluid portion flowing out from the gap across the pedestal top portion.

5. The rotary union of claim 4 wherein the containment vessel has a lower portion with a withdrawal opening for removing fluid from the containment vessel.

6. The rotary union of claim 1 wherein the support structure comprises a bearing, and the union further comprises a gap adjustment sleeve having a portion contacting the bearing and being movably mounted on the pedestal for selectively adjusting the size of the gap.

7. The rotary union of claim 1 wherein the housing is formed to have a plurality of discharge openings extending radially therethrough for allowing fluid exiting from the gap over the pedestal top portion to pass from the housing.

8. A rotary union for moving fluid from a first environment to a second environment, where the first environment is rotating with respect to the second environment, the rotary union comprising:

a housing having a first and a second end, a hollow region opening toward the second end, a housing bore for transmitting fluid, and a plurality of discharge openings; the hollow region having an internal surface and housing bore having an entrance port opening onto the internal surface;

a first connection, formed on the first end of the housing, for coupling the rotary union to the first environment;

a support member having a first portion, an intermediate portion, and a second portion, the support member received within the housing hollow region and coupled to the housing proximate the housing second end;

a pedestal having a first end, second end, and an intermediate portion, and having a pedestal bore therethrough for transmitting fluid; the pedestal bore having an exit port, and the diameter of the pedestal bore at the exit port being greater than the diameter of the housing bore at the entrance port;

a second connection formed on the second end of the pedestal for coupling the pedestal to a stationary fluid supply in the second environment;

a support structure coupling the pedestal and the housing with the pedestal bore exit port opposite the housing bore entrance port and a gap formed between the first end of the pedestal and the housing internal surface; the support structure interfacing with the intermediate portion of the support member and an intermediate portion of the pedestal, the gap formed between the pedestal and the housing allowing fluid to flow from the pedestal bore to the housing bore, across the gap, with some excess fluid leaving the gap, the excess fluid being discharged through the plurality of discharge openings; and a containment vessel coupled to the pedestal for capturing the excess fluid discharged through the plurality of discharge openings, the containment vessel formed to have at least one withdrawal opening for allowing the excess fluid to exit the rotary union.

9. The rotary union of claim 8 further comprising a seal between the pedestal and housing for substantially preventing the excess fluid from contacting the support structure.

10. The rotary union of claim 9 wherein the seal comprises a labyrinth seal formed by the first portion of the support member and a flanged overhang at the pedestal first end.

11. The rotary union of claim 8 further comprising a gap adjustment sleeve movably mounted on the pedestal intermediate portion, and interfacing with the support structure for adjusting the gap between the pedestal and the housing.

12. A rotary union for moving fluid from a first environment to a second environment, where the first environment is rotating with respect to the second environment, the rotary union comprising:

a housing having a first end coupled to the first environment and a housing bore therethrough, and a second end having a hollow region with an upper internal surface onto which the housing bore opens;

a pedestal having a pedestal bore therethrough, a first end, and a second end coupled to the second environment;

a plurality of bearings coupling the pedestal and the housing for relative rotation, with the first end of the pedestal disposed within the hollow region of the housing, with a gap formed between the pedestal first end and the housing upper internal surface and the pedestal bore opposite to and larger than the housing bore at the gap, allowing fluid communication between the housing bore and pedestal bore, across the gap, without contact between the pedestal and housing and with a portion of the fluid flowing out of the gap over the pedestal first end.

13. The rotary union of claim 12 further comprising a containment vessel coupled to the pedestal for capturing the fluid portion flowing out from the gap across the pedestal top portion.

14. The rotary union of claim 13 wherein the containment vessel has a lower portion with at least one withdrawal hole therethrough for allowing the captured fluid to exit.

15. The rotary union of claim 12 further comprising an adjustment sleeve having shoulders contacting the bearings and being movably mounted on the pedestal for selectively adjusting the gap between the housing and the pedestal.

16. The rotary union of claim 12 further comprising a seal between a portion of the pedestal and a portion of the housing for substantially preventing fluid from the gap from contacting the bearings.

17. The rotary union of claim 16 wherein the seal comprises the pedestal having a flanged overhang portion that forms a channel, and the housing includes a portion which is inserted into the channel to form a labyrinth for substantially preventing fluid from the gap from contacting the bearings.

18. The rotary union of claim 12 wherein the housing further includes a support member, removably secured within the hollow region, to interface with the bearings; and at least one discharge hole extending radially through the housing for exiting fluid from the hollow region.

19. The rotary union of claim 18 further comprising an adjustment sleeve having shoulders contacting the bearings and being movably mounted on the pedestal for selectively adjusting the gap between the housing and the pedestal; and wherein the housing is supported on the pedestal through support of the support member by the shoulder-contacted bearings.

20. A rotary union for communicating fluid between a stationary source and a rotating dispenser, comprising:

a pedestal having a bore for communicating fluid through said pedestal, from the source to an exit port; said pedestal bore having a diameter at said exit port:

a housing having a bore for communicating fluid through said housing, from an entrance port to the dispenser; said housing bore having a diameter at said entrance port which is less than said pedestal bore exit port diameter; and bearings supporting said housing for rotation relative to said pedestal, with said entrance port meeting said exit port at a gap formed between said housing and pedestal; said gap allowing fluid to be transmitted between said exit and entrance ports with a portion of said fluid flowing out of said gap; and said bearings being located below said gap with respect to gravity.

21. The rotary union of claim 20, wherein said pedestal has a top portion onto which said exit port opens; said housing has a hollow region which is fitted over said pedestal; said hollow region has an upper internal surface onto which said entrance port opens; and said gap is formed between said top portion and said upper internal surface.

22. The rotary union of claim 21, wherein said housing has a discharge hole extending radially through said housing, below said gap, to allow said fluid portion flowing out of said gap to exit said hollow region.

23. The rotary union of claim 22, further comprising a labyrinth seal located below said gap for preventing fluid from reaching said bearings.

24. The rotary union of claim 20, wherein said pedestal has a top portion and said exit port opens onto said top portion.

25. The rotary union of claim 24, wherein said pedestal bore is a longitudinal axial bore and said housing bore is a longitudinal axial bore.

26. The rotary union of claim 25, wherein said housing has a hollow region which is fitted over said pedestal; said hollow region has an upper internal surface onto which said entrance port opens; and said gap is formed between said top portion and said upper internal surface.

27. The rotary union of claim 26, wherein said housing has a discharge hole extending radially through said housing, below said gap, to allow said fluid portion flowing out of said gap to exit said hollow region.

28. The rotary union of claim 27, further comprising a containment vessel secured to said pedestal and annularly disposed about said housing, to contain said fluid portion exited through said discharge hole.

29. The rotary union of claim 28, further comprising a labyrinth seal located below said gap for preventing fluid from reaching said bearings.

30. The rotary union of claim 29, further comprising a gap adjustment sleeve coupled to the pedestal for adjusting the gap between the pedestal and housing.

31. The rotary union of claim 20, in combination with said fluid source connected to said pedestal and said dispenser connected to said dispenser.

32. The combination of claim 31, wherein said fluid source is a source of acid, and said dispenser is a rotating shaft of an acid processor of a semiconductor wafer processing system.

* * * * *